(No Model.)

S. S. BARRIE.
AUTOMATIC REVERSING GEAR.

No. 363,501. Patented May 24, 1887.

Witnesses:
O. F. Sundgren
Emil Herter.

Inventor
Samuel S. Barrie
by his attorneys
Brown & Call

UNITED STATES PATENT OFFICE.

SAMUEL S. BARRIE, OF BROOKLYN, NEW YORK.

AUTOMATIC REVERSING-GEAR.

SPECIFICATION forming part of Letters Patent No. 363,501, dated May 24, 1887.

Application filed March 12, 1887. Serial No. 230,576. (No model.)

*To all whom it may concern:*

Be it known that I, SAMUEL S. BARRIE, a citizen of the United States, residing in the city of Brooklyn, in the county of Kings and State of New York, have invented a new and useful Improvement in Automatic Reversing-Gear for Machinery which is Driven by Belts, of which the following is a specification, reference being had to the accompanying drawings.

The object of my invention is to provide, in washing machinery and other machinery driven by belts, for automatically reversing the motion of the machinery at determined intervals, that it may run in one direction during certain intervals and in the opposite direction during the intervening alternate intervals.

In carrying out my invention I employ an open driving-belt and a crossed driving-belt and a pulley wide enough for both belts on the line or main driving shaft and one fast and two loose pulleys on the shaft to be driven by said belts, and I employ a belt-shifter for each belt, to shift it to and from the fast pulley and one of the loose pulleys in the manner most common for driving machinery which requires to run in opposite directions; and my invention consists in certain mechanism, hereinafter described and claimed, whereby the operation of the belt-shifters to produce the periodical shifting of the belts to and from the fast and loose pulleys is effected.

Figure 1:
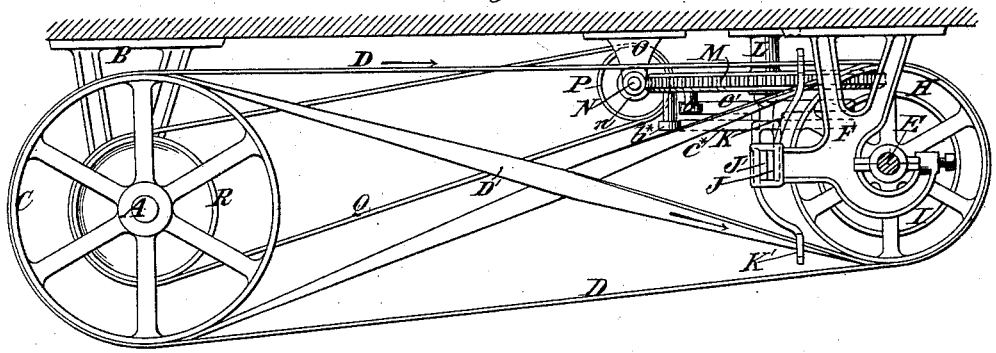
Figure 2:
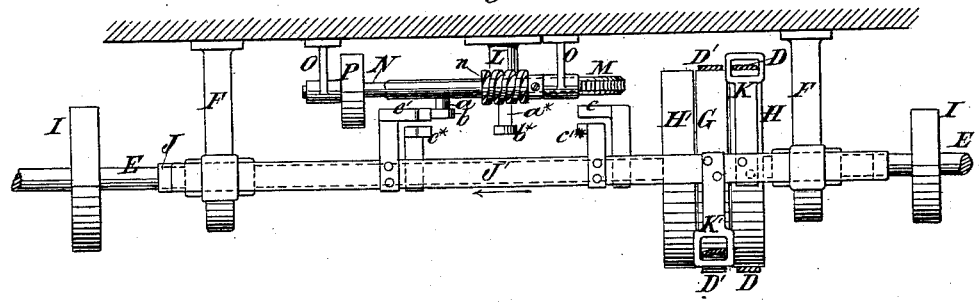
Figure 3:
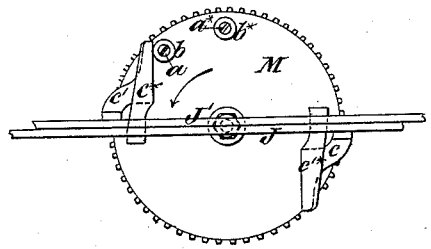

Figure 1 in the drawings is a side view of driving-gear illustrating my invention. Fig. 2 is a front view of the same, the line-shaft being omitted. Fig. 3 is an inverted plan of portions of two bars which carry the belt-shifters and the tappet-wheel for operating said bars.

Similar letters of reference indicate corresponding parts in the several figures.

A designates the line or main driving-shaft running in bearings in hangers B, and having upon it the pulley C, the face of which is wide enough to receive the open belt D and the crossed belt D'.

E designates the counter-shaft, which I will hereinafter speak of as the "reversing-shaft," running in bearings in hangers F, and having upon it the fast pulley G and the two loose pulleys H H', one for the open belt D and the other for the crossed belt D'. The said shaft has also fast upon it as many other pulleys, I, as there may be machines to be driven in opposite directions during alternate intervals of time, each of said pulleys requiring to be furnished with a belt for driving one of such machines. In suitable guides within the hangers F are fitted, side by side, the two bars J J', which carry the belt-shifters K K', one for each of the belts D D'.

At a short distance from the reversing-shaft there is secured a fixed upright hanger or stud, L, to which is fitted a horizontal wheel, M, the periphery of which is furnished with worm-gear teeth to gear with an endless screw, $n$, on a horizontal shaft, N, which runs in bearings in hangers O, and on which is a pulley, P, receiving a driving-belt, Q, which runs also on a pulley, R, on the line-shaft A, and which serves to drive the said shaft N and its endless screw $n$, and thereby to give a continuous slow rotary motion in one direction to the wheel M, the line-shaft A always rotating in one direction. On the said wheel or disk M there are two tappets, represented as consisting of wrist-pins $a$ $a^*$ and anti-friction rollers $b$ $b^*$, the said wrist-pins being of unequal length, so that their rollers or tappet-surfaces $b$ $b^*$ are in different planes, and hence that as the wheel M rotates the shorter tappet, $a$ $b$, may operate upon each of two tappet-pieces, $c$ $c'$, provided one upon each of the bars J J', and the lower tappet, $a^*$ $b^*$, may operate upon each of the two other tappet-pieces, $c^*$ $c'^*$, provided one upon each of the said bars, the said tappet-pieces $c$ $c'$ being made sufficiently longer than $c^*$ $c'^*$, as shown in Fig. 2, in order to compensate for the difference in the length of the tappets $a$ $b$ and $a^*$ $b^*$, and that each tappet may act only on its respective tappet-pieces. The said tappets and tappet-pieces are in other respects so arranged that at every half-revolution of the wheel M the tappet $a$ $b$ acts on one or the other of the tappet-pieces $c$ $c'$ to move its respective bar J or J' and belt-shifter K or K' in the direction to throw its respective belt D or D' from the fast pulley G to its respective loose pulley H or H', and that immediately after that action the tappet $a^*$ $b^*$ acts upon the tappet-piece $c'^*$ or $c^*$ of the other bar, J' or J, to move the said bar in the same direction, so that its shifter K′ or K will throw the other belt from its respective loose pulley to the fast pulley. In this way the belt-shifters are moved automatically in opposite directions alternately at regular intervals, and the open belt and crossed belt are each in turn caused to turn on the fast pulley G, and to drive the reversing-shaft in opposite directions alternately during alternate intervals of time.

What I claim as my invention, and desire to secure by Letters Patent, is—

1. The combination, with a main or line shaft, a main driving-pulley thereon, a second shaft carrying fast and loose pulleys, and open and crossed belts for running on said fast and loose pulleys from the pulley on the main shaft, of two belt-shifters, one for each belt, having attached tappet-pieces and a wheel carrying tappets, and means for producing continuous rotary motion of said wheel to produce the operation of said tappet-pieces automatically at regular intervals to move the belt-shifters in opposite directions alternately to effect the automatic reversal of the movement of the second shaft, substantially as herein described.

2. The combination, with the two belt-shifters, each having a longer and a shorter tappet-piece, of the tappet-wheel having tappets of different lengths, substantially as and for the purpose herein described.

3. The combination, with the main or line shaft A and its pulleys C and R, the reversing-shaft E and its fast and loose pulleys G H H′, the open and crossed belts D D′, the two belt-shifters and their tappet-pieces $c$ $c'$ $c^*$ $c'^*$, the worm-toothed tappet-wheel M, furnished with tappets $a$ $b$ $a^*$ $b^*$, the endless screw-shaft N $n$, gearing with said tappet-wheel and carrying a pulley, P, and the belt Q, all substantially as and for the purpose herein described.

SAMUEL S. BARRIE.

Witnesses:
FREDK. HAYNES,
HENRY J. McBRIDE.